United States Patent

[11] 3,588,663

| | | | |
|---|---|---|---|
| [72] | Inventor | Tsuyoshi Hirata Himeji, Japan | |
| [21] | Appl. No. | 786,619 | |
| [22] | Filed | Dec. 24, 1968 | |
| [45] | Patented | June 28, 1971 | |
| [73] | Assignee | Mitsubishi Denki Kabushiki Kaisha Tokyo, Japan | |
| [32] | Priority | Dec. 28, 1967 | |
| [33] | | Japan | |
| [31] | | 42/109894 | |

[54] CONTROL FOR CHARGING GENERATOR
4 Claims, 1 Drawing Fig.

[52] U.S. Cl. ............................................ 320/39, 320/48, 320/64, 322/28
[51] Int. Cl. ................................................................. H02j 7/24
[50] Field of Search ............................................. 320/9—12, 39, 40, 48, 59, 64

[56] References Cited
UNITED STATES PATENTS

| | | | |
|---|---|---|---|
| 3,217,311 | 11/1965 | Custer et al. | 320/48X |
| 3,336,519 | 8/1967 | Grimm | 320/48 |
| 3,343,059 | 9/1967 | Kirk et al. | 320/39 |
| 3,365,646 | 1/1968 | Brewster | 320/64 |
| 3,430,124 | 2/1969 | Nolan | 320/48 |
| 3,469,167 | 9/1969 | Wright | 320/48 |
| 3,479,575 | 11/1969 | Wright et al. | 320/48 |
| 3,496,443 | 2/1970 | Snedeker et al. | 320/39 |
| 3,515,978 | 6/1970 | Williams et al. | 320/64 |

*Primary Examiner*—William M. Shoop, Jr.
*Attorneys*—Robert E. Burns and Emmanuel J. Lobato ABSTRACT: With a battery not being charged a switching transistor turns ON to fire an indication lamp while a charging generator is separately excited. When a voltage across the generator additionally self-excited reached a predetermined magnitude a control transistor conducts to turn OFF the switching transistor. This deenergizes the lamp and interrupts the application of all excitation to the generator. Both transistors and the associated components are formed into an integrated circuit.

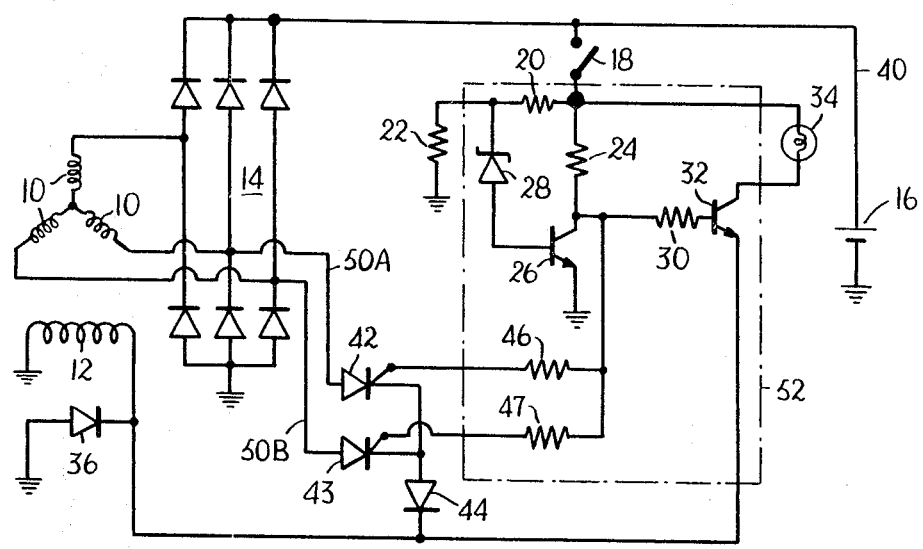

CONTROL FOR CHARGING GENERATOR

BACKGROUND OF THE INVENTION

This invention relates in general to a charging generator and more particularly to a control device for controlling a charging generator used in charging a storage battery equipped on a motorcar.

The conventional type of control devices for such charging generators has been generally provided with an indication lamp for indicating whether or not the generator is charging the associated storage battery. The indication lamp has been normally controlled so that it is energized when the battery is not charged while it is deenergized when the battery is being charged. That is, the indication lamp is electrically connected so as to indicate that the storage battery is being charged. Such an indication lamp is preferably connected in a circuit for separately exciting the field winding of the generator. This permits the configuration of the associated circuitry to be simplified through the utilization of an electric current for exciting the generator without the necessity of a particular separate circuit for that purpose. This is because a circuit for separately exciting the generator is usually provided to excite it satisfactorily in the case the generator is low in the number of rotation to produce a low output voltage thereacross.

If the circuit for separately exciting the generator is utilized to fire the associated indication lamp then it is required to prevent an exciting current flowing into the generator from passing through that separately exciting circuit provided that the generator increases in output voltage to effect charging of the storage battery. The reason for this is that, if the exciting current flows through the separately exciting circuit that the indication lamp is fired to indicate that the storage battery is not being charged notwithstanding the battery is being actually charged.

In order that during charging of the storage battery the exciting current is prevented from flowing into the generator through the separately exciting circuit, it is required to insert into that circuit a switching element opened when the storage battery is being charged. On the other hand, even if the switching element is in its open position to maintain the separately exciting circuit in its interrupted state, the generator must continue to supply the exciting current to the generator. This supply of the exciting current to the generator continues as long as the storage battery is charged and due to the output voltage from the generator being quite high that current is substantially provided as a self-exciting current. Therefore, in addition to the separately exciting circuit, a self-exciting circuit should be necessarily used.

Control devices for alternating current generator for use with motor vehicles meeting the above-mentioned requirements are described and claimed in the copending U.S. application Ser. No. 771,489 filed Oct. 29, 1968, by Kenjiro Arakane and assigned to the same assignee as the present application. According to the above cited application, a thyristor is used as a switching element connected in a circuit for separately exciting the associated generator. The thyristors are difficult to be formed by the existing technique for producing integrated circuits for the following reasons. First, any integrated circuit is required to be operated with low voltages which are, in turn, difficult to perform the precise operation of thyristors involved. Second, the gate electrodes of the thyristors are difficult to be formed by the existing technique for producing integrated circuits. In addition, the thyristors are difficult to be brought into their open state. In the cited application the opening of the thyristor is accomplished by utilizing a voltage developed in that half cycle of AC voltage from the generator in which a reversed voltage is applied to the thyristor. However as the generator has a full wave rectifier connected to the output terminals thereof a sufficiently high reversed voltage can not be applied to the thyristor resulting in the difficulty with which the thyristor is brought into its open state.

SUMMARY OF THE INVENTION

Accordingly, it is an object of the invention to provide a new and improved device for controlling a charging generator for use with a motor vehicle in which a switching element capable of being readily formed by the existing technique for producing integrated circuits is used to control a circuit for separately exciting the generator.

The invention accomplishes this and other objects by the provision of a device for controlling a charging generator for use with a motor vehicle, comprising a transistor element connected in circuit means for separately exciting the generator to interrupt that circuit when the output voltage from the generator exceeds a predetermined magnitude and another circuit means for exciting the generator.

BRIEF DESCRIPTION OF THE DRAWING

The invention will become more readily apparent from the following detailed description taken in conjunction with the accompanying drawing wherein a single FIGURE is a schematic circuit diagram of a control device constructed in accordance with the principles of the invention.

DESCRIPTION OF THE PREFERRED EMBODIMENT

Referring now to the drawing, it is seen that three wye-connected windings 10 form a windings of a 3-phase generator including a field winding 12. The generator is driven by a prime mover such as an internal combustion engine equipped, for example, on a motor vehicle although the engine and vehicle are not illustrated only for purpose of simplification. The generator windings 10 have a 3-phase full wave rectifier device 14 connected thereto to provide a full wave rectified output with the negative output terminal connected to a chassis (not shown) serving as the ground. The field winding 12 is also connected at one end to the ground. Connected across the full wave rectifier device 14 is a storage battery 16 also equipped on the vehicle with the negative terminal connected to the ground.

A manually operated key switch 18 has a contact connected to the positive terminals of the battery and the rectifier device 16 and 14 respectively and an arm connected to the ground through a pair of serially connected resistors 20 and 22. The arm of the switch 18 is also connected through a resistor 24 to a collector of a control transistor 26 shown as being of the NPN-type. The transistor 26 includes an emitter connected directly to the ground and a base connected to the junction of the resistors 20 and 22 through a Zener diode 28 having an anode connected to the base and a cathode connected to the junction. The collector of the transistor 26 is connected through a resistor 30 to a base of the NPN-type. The transistor 32 includes a collector connected to the arm of the switch 18 through an indication lamp 34 and an emitter connected to the other end of the field winding 12 having shunted thereacross a diode 36 serving as a surge absorber. The switch 18, the indication lamp 34 and the collector-to-emitter circuit of the transistor 32 form a circuit connected across the storage battery 16 and the field winding 12 to permit the battery 16 to supply an exciting current the field winding 12 when the transistor 32 is in its ON state. That is, that circuit serves to separately excite the field and hence the generator and may be called herein a separately exciting circuit generally designated by the reference numeral 40.

As shown, selected two of the 3-phase windings 10 has connected at the output ends a pair of thyristors 42 and 43 respectively. More specifically both the thyristors 42 and 43 have the respective anodes connected to the two windings 10 and the respective cathodes connected together and to the other end of the field winding 12 through a diode 44. The thyristors 42 and 43 have further the respective gate electrodes connected together and to the junction of the resistor 24 and the collector of the control transistor 26 through resistors 46 and 47 respectively. Thus it will be appreciated that the pair of thyristors 42 and 43 and the diode 44 connected serially thereto form a pair of circuits connected across the generation and field winding 10 and 12 respectively to permit the generation winding to supply exciting current to the field winding 12 when the thyristors are in their ON state. That is, those circuits serve to self-excite the field winding 12 and may be called herein self-exciting circuits generally designated by the reference characters 50A and B. If desired, the number of the self-exciting current may vary.

Block 52 is shown as including the resistors 20, 22, 24, 30, 46 and 47, the transistors 26 and 32 and the Zener diode 28. These components can readily be formed into an integrated circuit on the associated single substrate by the existing technique for producing integrated circuit.

The arrangement illustrated is operated as follows: The key switch 18 is manually closed to start the engine (not shown) in the well-known manner. On the other hand, the storage battery supplies a base current through the closed switch 18, the resistors 24 and 30 and the field winding 12 to the switching transistor 32 to turn it ON. This causes the indication lamp 34 to be fired to indicate that the battery is not being charged. At the same time the battery 16 applies the initial separate excitation to the generator through the separately exciting circuit 40.

After the engine has been driven, the same rotates the generator to induce a 3-phase AC voltage across the generation winding 10. Then, due to the presence of the diode 44, a unidirectional voltage appears on the anode of each thyristor 42 or 43. As the self-exciting circuit 40 has been completed a gating current is supplied to the gate electrodes of the thyristors 42 and 43 by the battery 16 through the junction of the resistors 24 and 30. Therefore both the thyristors turn ON whereby the generation winding 10 additionally supplies an exciting current to the field winding 12 through each of self-exciting circuits 50A and B. Thus the field winding 12 has supplied thereto a sufficient exciting current.

Then the generator increases in the number of turns rotation until a full wave rectified output voltage from the full wave rectifier device 14 approaches the voltage across the storage battery 16. This increases the potential at the emitter of the transistor 32 applied through the diode 44 connected to the thyristors 42 and 43 whereby the fired lamp 34 is nearly deenergized. This indicates that the battery enters the charging process.

Thereafter the AC voltage induced across the generation winding 10 and therefore the rectified voltage from the rectifier device 14 will increase to a predetermined magnitude above which the battery is overcharged. Since the Zener diode 28 has been selected to have a Zener voltage corresponding to such a predetermined magnitude, the same now breaks down to render the control transistor 26 conductive. The conduction of the transistor 26 causes the transistor 32 to be blocked whereby the indication lamp 34 is completely turned off. The conduction of the transistor 26 also interrupts the gating currents to the thyristors 42 and 43. Then each of the thyristors 42 and 43 is put in its open state at the instant the forward current flowing through that thyristor decreases below the magnitude of holding current. Consequently all the exciting currents disappear leading to a decrease in output from the generator and therefore the rectifier device.

If the voltage across the storage battery 16 decreases below a predetermined magnitude, the Zener diode and transistor 28 and 26 respectively are brought into their nonconducting state whereas the transistor 32 and the thyristors 42 and 43 are put in their conducting state. This permits the application of the excitation to the generator in the manner as previously described thereby to increase the output voltage from the generator. Under these circumstances, the emitter of the transistor 32 has a positive potential supplied thereto from the generator through the thyristors 42 and 43 and the diode 44 which potential is substantially equal in magnitude to the potential at the positive terminal of the battery 16. This causes the indication lamp 34 to be maintained deenergized indicating that the battery is being charged. Then the battery is fully charged.

In this way the process as above described is repeated to maintain the voltage across the battery substantially at a predetermined magnitude.

While the invention has been illustrated and described in conjunction with a few preferred embodiments thereof it is to be understood that various changes in the details of construction and the combination and arrangement of parts may be resorted to without departing from the spirit and scope of the invention. For example, the resistor 30 may be omitted to connect the collector of the control transistor 26 directly to the base of the switching transistor 32. The generator 10 may be of the single phase type. Alternatively the combination of the generator and rectifier device may be replaced by any suitable type of charging generators. Further the NPN-type transistors illustrated may be PNP-type transistors with the polarity of the battery reversed from that illustrated.

I claim:

1. A control device for controlling a charging generator for use with a motor vehicle, comprising, in combination;

a storage battery;

an AC generator driven in operation by a prime mover thereby to produce an AC output and having a field winding;

a full wave rectifier connected to receive the AC output of said AC generator to rectify said AC output and charge said storage battery;

a first exciting circuit for supplying a separate exciting current to said field winding of said AC generator from said storage battery;

an indication lamp connected in said first exciting circuit means responsive to a flow of current through said separate exciting circuit energized when said storage battery is not charged by the output from said full wave rectifier;

a second exciting circuit connected to the input of said full wave rectifier, said second exciting circuit means having connections supplying a self-exciting current to said field winding in response to the output from said AC generator and deenergizing said indication lamp in response to increase of the output from said AC generator when said storage battery is charged by the output from said full wave rectifier;

a switching transistor serially connected to said indication lamp in said first exciting circuit to open or close the first exciting circuit;

a first switching element for opening and closing of said second exciting circuit; and a second switching element operating in response to the output voltage from said full wave rectifier to open both said switching transistor and the first switching element when said output voltage from said full wave rectifier reaches a value to over charge said storage battery, thereby to interrupt both said first and second exciting circuits.

2. A control device as claimed in claim 1, in which said first switching element comprises a thyristor.

3. A control device as claimed in claim 1, in which said first switching element comprises a thyristor, and said second exciting circuit means comprises a diode serially connected to said thyristor and connected to exhibit a forward directional characteristic with respect to a voltage having a same polarity as that of said thyristor.

4. A control device as claimed in claim 1, wherein said second switching element comprises a transistor.